J. & M. BRODSKY.
DOUGH MOLDING MACHINE.
APPLICATION FILED APR. 30, 1915.

1,195,969.

Patented Aug. 29, 1916.

Witnesses:
Leonard W. Novander
Charles A. Bastar

Inventors
Jacob Brodsky
Max Brodsky
By George D. Ives
Att'y

UNITED STATES PATENT OFFICE.

JACOB BRODSKY AND MAX BRODSKY, OF CHICAGO, ILLINOIS.

DOUGH-MOLDING MACHINE.

1,195,969.   Specification of Letters Patent.   Patented Aug. 29, 1916.

Application filed April 30, 1915. Serial No. 25,088.

*To all whom it may concern:*

Be it known that we, JACOB BRODSKY and MAX BRODSKY, subjects of the Czar of Russia, and residents of the city of Chicago, county of Cook, and State of Illinois, have invented a new and Improved Dough-Molding Machine, of which the following is a full, clear, and exact description.

Our invention relates to machines for molding or shaping plastic materials, such as dough, and other substances.

Our invention contemplates a machine having a wide range of adaptability in the baking industry owing to the fact that a plurality of different dough shaping or molding units are disposed in proximity to one another and are connected to the same source of power, thus affording means whereby a plurality of pieces of dough may simultaneously be molded into a plurality of different shapes and sizes.

The mechanism which we employ comprises a plurality of circular rotatable members which coöperate with stationary parts so as to roll or mold the dough into different shapes as desired. This molding mechanism is preferably made of wood, although any other material may be used if desired. The stationary parts are constructed so as to be easily removed from the supporting frame for the purposes of cleaning or otherwise.

Figure 2:
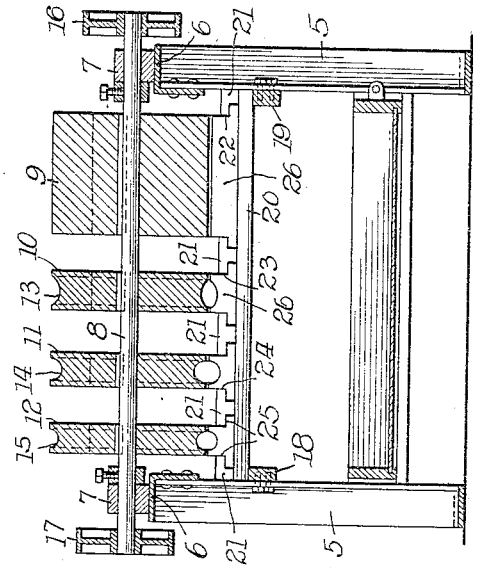
Figure 4:
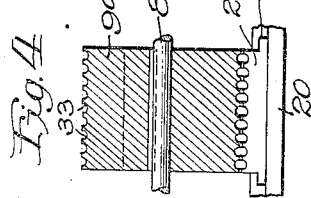
Figure 1:
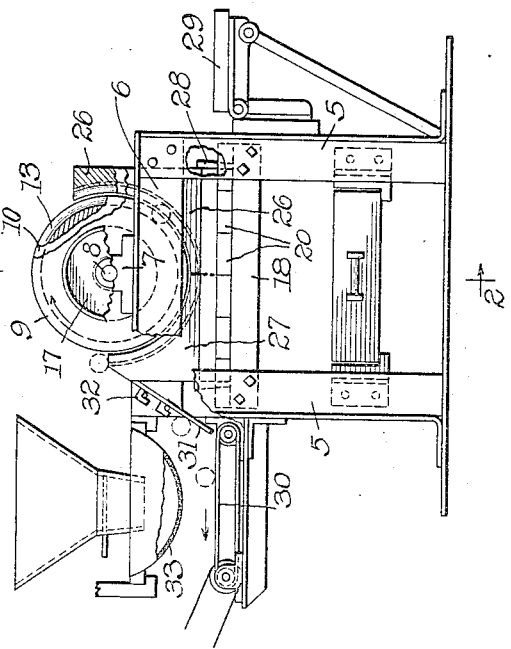
Figure 3:
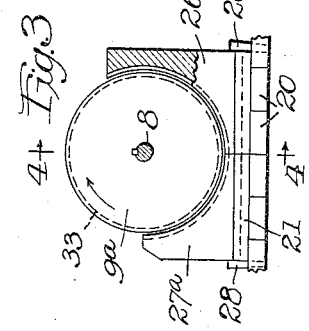

Our invention will be better understood by reference to the accompanying drawing, in which, Figure 1, is an end view of a machine embodying the features of our invention. Fig. 2, is a cross-sectional view taken on line 2—2 of Fig. 1. Fig. 3, is a side view of a modified form of shaping circular member and coöperating parts. Fig. 4, is a cross-sectional view taken on line 4—4 of Fig. 3.

The supporting frame of our invention comprises vertical members 5, 5 which carry at their tops the cross pieces 6, 6 to which are secured the bearings 7, 7 in which the shaft 8 is journaled. This shaft has secured thereto as by means of keys or otherwise, the circular drum 9, and the wheels 10, 11 and 12, all of which are preferably made of wood. The drum has a straight face and the wheels 10, 11 and 12 have grooves 13, 14 and 15 of different depths and sizes to meet different requirements. The shaft 8 has mounted thereon a pair of pulleys 16 and 17, either of which may be connected to a source of power so as to rotate the drum and wheels.

The vertical members 5, 5 have secured thereto cross-members 18 and 19 to which are secured the longitudinal pieces 20 to the tops of which the spacing blocks 21 are fastened thus forming inverted T shaped grooves 22, 23, 24 and 25 below and tangent to the drum 9 and the wheels 10, 11 and 12 respectively. Into each of these grooves are removably placed the segmental members 26 and 27 which are adapted to coöperate with the drum and wheels in the molding operation. These members are preferably made of wood and as shown in connection with the wheels are grooved correspondingly. The members coöperating with the drum 9, as shown, present ungrooved surfaces to the periphery thereof. Pins 28 serve to maintain the members 26 and 27 in their relative positions, that is, slightly away from the rotatable parts.

At one side of the frame a hinged platform 29 is provided for an operator who feeds the dough into the machine and when it emerges it is directed to the movable conveyer 30 by means of the inclined plane 31 provided with ears 32 for engagement with pins extending from the frame. A sieve 33 is suitably supported and is arranged to be shaken by proper mechanism (not shown) to permit flour to be sprinkled on the dough.

In Figs. 3 and 4 the construction is similar to that just described except that the drum 9$^a$ is provided with a plurality of grooves 33, and, of course, the segmental members 26$^a$ and 27$^a$ are correspondingly grooved.

From the foregoing description it will be apparent that our invention contemplates a compact and efficient machine which may be employed to simultaneously shape or mold dough into a plurality of shapes and sizes.

While we have herein shown and described certain features of our invention, it will be apparent to those skilled in the art that modifications may be made without departing from the spirit and scope thereof.

We claim—

1. A machine for the molding of dough, comprising a frame, a grooved rotatable wheel carried thereby, and separable stationary parts adapted for coöperation with said wheel and provided with surfaces corresponding to the periphery of said wheel, said frame having a groove parallel to a line tangent to said rotatable wheel, said stationary parts having base portions fitting into said groove, thus permitting said stationary parts to be slid into place in opposite directions beneath said wheel without disturbing the same.

2. The combination of a machine for molding dough comprising a frame, a shaft, a plurality of circular members on said shaft having different peripheries, a plurality of separable segmental parts coöperating with said members for effecting the molding operation, said frame having grooves parallel to a line tangent to said members, said segmental parts having base portions of the same conformation as said grooves thus permitting said segmental parts to be slid into position in opposite directions beneath said members without disturbing the same.

3. A machine for molding dough, comprising a frame having a groove, a rotatable circular member, said groove being parallel to a line tangent to said member, and a pair of stationary members held in said groove adjacent to said rotatable member having surfaces corresponding to a periphery of said circular member, said stationary members adapted to be slid into said groove in opposite directions so that their point of contact is beneath but away from the rotatable member.

4. A machine for molding dough comprising a frame having a groove, a rotatable circular member, said groove being parallel to a line tangent to said member, stationary segmental members held in said groove adjacent to said rotatable member and having surfaces corresponding to the periphery of said circular member, said stationary members being adapted to be slid into said groove in opposite directions so that their point of meeting is beneath but not engaging said circular member.

5. A machine for molding dough comprising a frame having a groove, a rotatable circular member, said groove being parallel to a line tangent to said member, stationary segmental members held in said groove adjacent to said rotatable member, and having surfaces corresponding to the periphery of said circular member, said stationary members adapted to be slid into said groove in opposite directions so that their point of meeting is beneath but not engaging said circular member and devices for maintaining said stationary members in such position.

6. A machine for molding dough, comprising a frame having a groove, a grooved rotatable wheel carried thereby, said groove being parallel to a line tangent to said wheel, and grooved segmental members on said frame for coöperation with said wheel, said segmental members adapted to be slid into said groove in opposite directions so that their point of meeting is beneath the rotatable wheel without disturbing the same.

7. A machine for molding dough comprising a support, having a slot, a grooved rotatable wheel carried thereby, said slot being parallel to a line tangent to said wheel, and grooved segmental members held in said slot in proximity to said wheel, said members being adapted to be slid into position in opposite directions so as to come into engagement beneath said wheel without disturbing the same.

8. A machine for molding dough comprising a support having a slot, a grooved rotatable wheel carried thereby, said slot being parallel to a line tangent to said wheel, and a pair of grooved members held in said slot for coöperation with said wheel, said members adapted to be slid into said slot in opposite directions so as to come into engagement beneath the wheel without disturbing the same.

9. A machine for molding dough comprising a frame having a slot, a rotatable circular member, said slot being parallel to a line tangent to said member, stationary segmental members held in said slot adjacent to said rotatable member and having surfaces corresponding to the periphery of said circular member, said stationary members adapted to be slid into said slot in opposite directions so that their point of meeting is beneath but not engaging said circular member, and pins secured in said frame for maintaining said segmental members in a fixed position on said frame.

In witness whereof we have signed our names to the foregoing specification in the presence of two subscribing witnesses.

JACOB BRODSKY.
MAX BRODSKY.

Witnesses:
SAMUEL BRODSKY,
ELLA BLUM.

Copies of this patent may be obtained for five cents each, by addressing the "Commissioner of Patents, Washington, D. C."